O. LINDEMANN.
Fountain-Cup for Animal Cages.
No. 196,684. Patented Oct. 30, 1877.
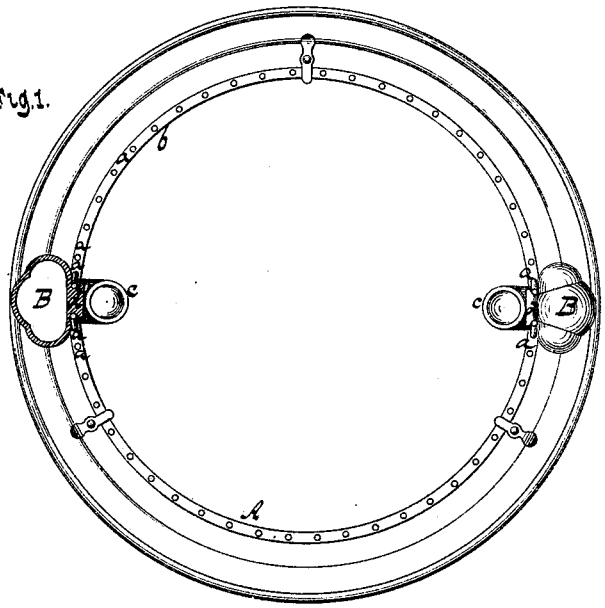
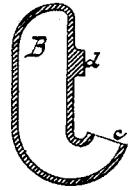
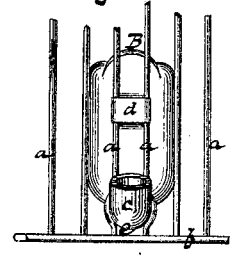
Witnesses.
Otto Hufeland
Hugo Brueggemann
Inventor.
Otto Lindemann
by
Van Santvoord & Hauff
his attorneys.

UNITED STATES PATENT OFFICE.

OTTO LINDEMANN, OF EDGEWATER, NEW YORK.

IMPROVEMENT IN FOUNTAIN-CUPS FOR ANIMAL-CAGES.

Specification forming part of Letters Patent No. 196,684, dated October 30, 1877; application filed September 29, 1877.

*To all whom it may concern:*

Be it known that I, OTTO LINDEMANN, of Edgewater, in the county of Richmond and State of New York, have invented a new and useful Improvement in Fountain-Cups for Animal-Cages, which improvement is fully set forth in the following specification, reference being had to the accompanying drawing, in which—

Figure 1 represents a horizontal section of an animal-cage provided with my fountain-cup. Fig. 2 is a vertical section of one of my cups. Fig. 3 is an inside view of the same when secured in position between the filling wires of the cage.

Similar letters indicate corresponding parts.

This invention consists in a fountain-cup provided with an upwardly-curved spout at its bottom end, and with a dovetailed or undercut lug on its inner surface, said lug being adapted to catch between the filling-wires of a cage, and to retain the cup securely in position, the respective filling-wires being curved outward to form an opening for the admission of the spout.

In the drawings, the letter A designates a cage, which is constructed of the filling-wires *a a* and the cross-bands *b*, in any suitable manner. The feed and water cups which I use in connection with this cage are made in the form of fountain-cups B, preferably of glass, but any other material may be used in their manufacture. These cups are closed at their tops, and from their bottoms project curved spouts *c*, while on their inner surfaces are secured lugs *d*, which are dovetailed or undercut, (see Fig. 1,) and which are of such a width that they can be passed between two adjoining filling-wires only by springing these wires apart. When one of the lugs has been passed through between two adjoining filling-wires, these wires, in seeking to recover their original position, catch in the dovetailed or undercut sides of the lug, and prevent the same from passing out of their gripe spontaneously.

The filling-wires between which one of the cups is to be inserted are curved outward to form apertures *e*, Fig. 3, through which the spout of the cup can pass freely, and when the spout has been passed through this aperture, and the lug *d* is forced through between the same pair of filling-wires, the cup is securely retained in position. In order to remove the feed-cup, the filling-wires have to be forced apart, so as to release the lug.

By this arrangement the use of fountain-cups for cages of the construction shown in the drawing is rendered feasible, and said fountain-cups can be easily attached and detached. The water contained in one of the cups flows to the spout as fast as it is consumed, and it can easily be reached by the bird to the last drop. The seed contained in the other cup descends gradually to the spout whenever the bird stirs up the seed contained in the spout, no seed can be spilled, and all the seed contained in the cup will gradually find its way into the spout.

What I claim as new, and desire to secure by Letters Patent, is—

The combination, with a bird-cage, of the removable fountain-cup B, having the spout C arranged to pass between two adjacent wires of the cage, and the lug *d*, having inwardly-beveled edges arranged to pass between, and extending laterally in opposite directions, to hug the two wires, as described.

In testimony that I claim the foregoing I have hereunto set my hand this 26th day of September, 1877.

OTTO LINDEMANN.

Witnesses:
    J. VAN SANTVOORD,
    E. F. KASTENHUBER.